US010976466B2

(12) United States Patent
Villien

(10) Patent No.: US 10,976,466 B2
(45) Date of Patent: Apr. 13, 2021

(54) LOCATING A DEVICE THAT IS MOVED IN A THREE-DIMENSIONAL SPACE

(71) Applicants: MOVEA, Grenoble (FR);
Commissariat à l'énergie atomique et aux énergies alternatives, Paris (FR)

(72) Inventor: Christophe Villien, Seyssinet-Pariset (FR)

(73) Assignees: MOVEA, Grenoble (FR);
Commissariat à l'énergie atomique et aux énergies alternatives, Paris (FR)

( * ) Notice: Subject to any disclaimer, the term of this patent is extended or adjusted under 35 U.S.C. 154(b) by 70 days.

(21) Appl. No.: 16/555,163

(22) Filed: Aug. 29, 2019

(65) Prior Publication Data
US 2019/0383964 A1     Dec. 19, 2019

Related U.S. Application Data

(63) Continuation of application No. 14/741,818, filed on Jun. 17, 2015, now Pat. No. 10,408,970.

(30) Foreign Application Priority Data

Jun. 18, 2014  (FR) ...................................... 1455575

(51) Int. Cl.
| | |
|---|---|
| *G01V 9/00* | (2006.01) |
| *G01C 21/16* | (2006.01) |
| *G01C 21/20* | (2006.01) |
| *G01B 21/16* | (2006.01) |

(52) U.S. Cl.
CPC ............... *G01V 9/00* (2013.01); *G01B 21/16* (2013.01); *G01C 21/16* (2013.01); *G01C 21/206* (2013.01)

(58) Field of Classification Search
None
See application file for complete search history.

(56) References Cited

U.S. PATENT DOCUMENTS

| | | | |
|---|---|---|---|
| 8,548,738 B1 | 10/2013 | Kadous et al. | |
| 9,130,611 B2 * | 9/2015 | Jia | ........................ H04B 7/0408 |

(Continued)

FOREIGN PATENT DOCUMENTS

| | | |
|---|---|---|
| EP | 2519803 B1 | 1/2014 |
| WO | WO2012009328 | 1/2012 |
| WO | WO2012/158441 | 11/2012 |

OTHER PUBLICATIONS

Edwards et al. "Comparing Particle Swarm Optimisation and Genetic Algorithms for Nonlinear Mapping" 2006 IEEE International Conference on Evolutionary Computation pp. 694-701 (Year: 2006).*

(Continued)

*Primary Examiner* — Roy Y Yi
(74) *Attorney, Agent, or Firm* — Occhiuti & Rohlicek LLP

(57) ABSTRACT

A method of location of a device includes a displacement law containing a corrective factor of a bias combined by an arithmetical operation with a measured variable, and particles, each particle being associated with a current value of the corrective factor. The current value of the corrective factor being constructed at each iteration on the basis of a previous current value of the corrective factor, computed during a previous iteration, to which is added a random variable drawn according to a predefined probability law. The current values of various particles are initialized, before the first iteration, to various initial values, and during each iteration, for each particle whose coordinates are updated with the aid of this displacement law, the value of the corrective factor in the displacement law is taken equal to this corrective factor's current value associated with the particle.

22 Claims, 1 Drawing Sheet

(56) References Cited

U.S. PATENT DOCUMENTS

| | | |
|---|---|---|
| 2005/0130677 A1 | 6/2005 | Meunier |
| 2009/0043504 A1 | 2/2009 | Bandyopadhyay |
| 2009/0201149 A1 | 8/2009 | Kaji |
| 2011/0211563 A1 | 9/2011 | Herrala |
| 2012/0283855 A1 | 11/2012 | Hoffman |
| 2012/0290254 A1 | 11/2012 | Thrun |
| 2013/0245991 A1 | 9/2013 | Kriss |
| 2013/0297204 A1 | 11/2013 | Bartels |
| 2014/0149069 A1 | 5/2014 | Kelly et al. |
| 2014/0350847 A1 | 11/2014 | Ichinokawa |

OTHER PUBLICATIONS

Arulampalam et al. "A Tutorial on Particle Filters for Online Nonlinear/ Non-Gaussian Bayesian Tracking," IEEE Trans Sign Proc, 2002, vol. 50, pp. 174-186.

Krach et al. "Cascaded Estimation Architecture for Integration of Foot-Mounted Inertial Sensors," In the Proceedings of the 2008 IEEE/ION Position Location and Navigation Symposium, Monterey, CA, USA, MAy 5-8, 2008, pp. 112-119.

Schmitz et al., "Combination of Map-Supported Particle Filters with Activity Recognition for Blind Navigation," ICCHP (2), 2012, vol. 7383 of Lecture Notes in Computer Science, pp. 529-535.

Straub. "Bachelor Thesis: Pedestrian Indoor Localization and Tracking using a Particle Filter combined with a learning Accessibility Map," Executed at the Institute for Real-Time Computer Systems, München, DE (Submitted Aug. 2010).

Woodman et al. "Pedestrian Localisation for Indoor Environments," In the Proceedings of the 10th International Conference on Ubiquitous Computing, 2008, ACM: New York, pp. 114-123.

\* cited by examiner

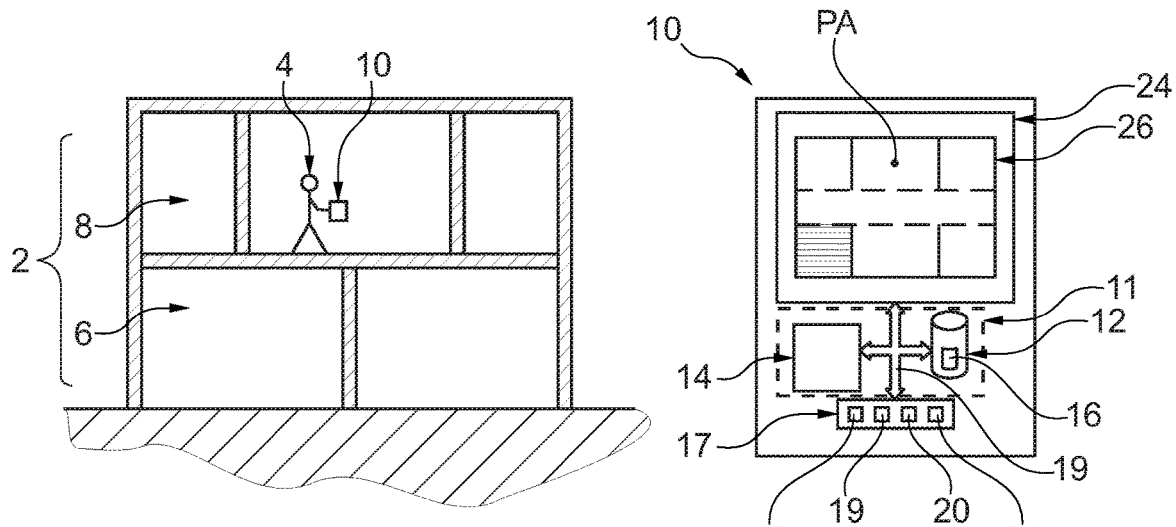
Fig. 1
Fig. 2
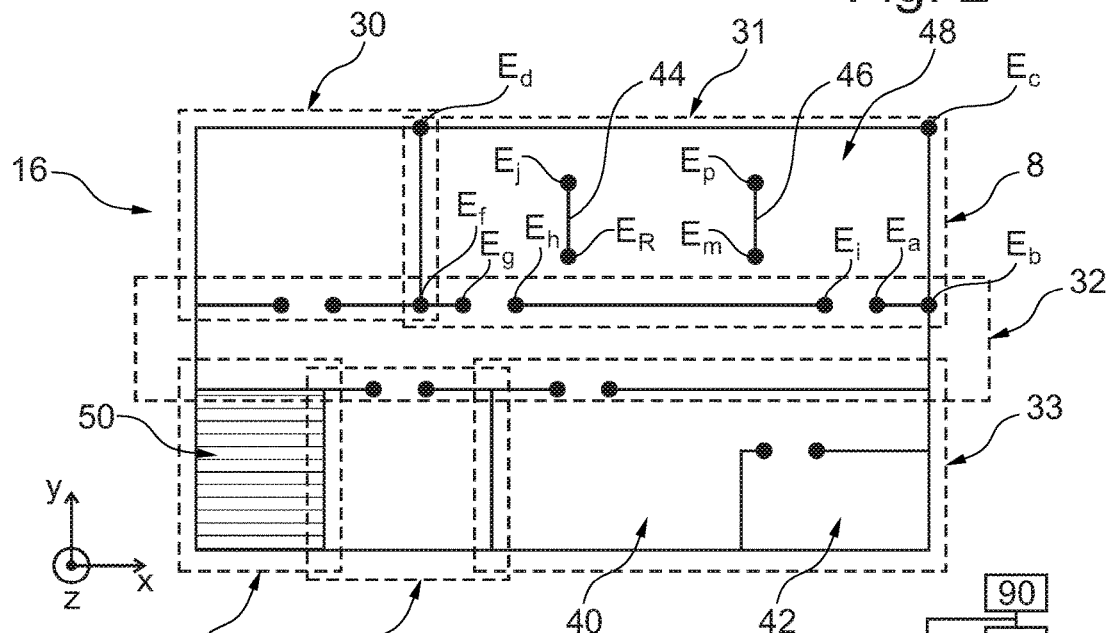
Fig. 3
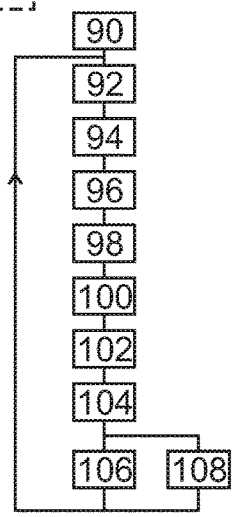
Fig. 4

LOCATING A DEVICE THAT IS MOVED IN A THREE-DIMENSIONAL SPACE

RELATED APPLICATIONS

Under 35 USC 120, this application is a continuation of U.S. application Ser. No. 14/741,818, filed Jun. 17, 2015, which claims the benefit of the Jun. 18, 2014 priority date of French Application FR 1455575, the contents of which is herein incorporated by reference in their entirety.

FIELD OF INVENTION

The invention relates to locating a device as it is displaced inside a three-dimensional space.

BACKGROUND

It is often useful to locate a device that has been displaced within a three-dimensional space. This is particularly useful when the device is GPS inaccessible, as is often the case inside buildings or shopping malls.

Known methods of location rely on measurements provided by an inertial platform housed within the device itself to measure the direction and amplitude of that device's displacement from a previous position. Among these known methods are those that use "particle filters" to estimate the position of the device in the three-dimensional environment. Particle filters exploit the fact that there exist predefined constraints on the displacements of the device inside the three-dimensional environment. A typical constraint might be that a displacement cannot pass through a wall.

Under ideal conditions, known methods make it possible to precisely estimate the position of the device. However, in reality, there may exist a constant or systematic bias in the device's direction of displacement and/or in the amplitude of the device's displacement in that direction. This bias may have very different origins.

In some cases, a systematic bias arises from a bias in the measurements of one or more sensors of the device's inertial platform. In other cases, a systematic bias arises from an error in modeling the relation that links the measurements of the inertial platform to the displacement's direction or amplitude. Yet another source of such systematic bias is incorrect positioning of the device with respect to its direction of displacement.

If not corrected, a systematic bias degrades the precision of an estimate of the device's position. It is therefore desirable to correct it.

A difficulty that arises is that, to correct such a bias, it is necessary to know its value. In most cases, this value is not known in advance. Ideally, one should calibrate the device before using it. This would enable it to determine its systematic bias. This value could then be used to correct forthcoming position estimates.

However, obliging the user to execute a prior calibration phase before launching the location of the device is in most cases impractical. To make matters worse, in some cases, bias evolves over time. Thus, a user would have to recalibrate the device from time-to-time.

SUMMARY OF INVENTION

The invention is aimed at avoiding this problem. In one aspect, the invention features a method of precisely locating the device even in the presence of a bias in a displacement's amplitude or direction.

One method features associating first particles with a first initial value for a corrective factor and associating second particles with a second initial value for this same corrective factor.

To understand the benefit of this method, it is assumed that the first initial value is close to the actual value of the bias to be corrected. Conversely, it is assumed that the second initial value is further from the actual value of the bias to be corrected. Thus, the values of the corrective factor that are associated with the first particles make it possible to compensate the bias more correctly, and therefore to estimate the displacement of the device more precisely, on the basis of the same measurements.

The method of the invention features a variation of a procedure that begins with first and second steps. The first step is that of providing a map of the three-dimensional space and of predefined constraints on the displacements of the device in this three-dimensional space. The second step is that of using a computer to generate several distinct particles. Each particle is associated with coordinates coding its position on the map. Each particle is also associated with a weight that represents the probability that the device is situated at the site of this particle.

The method then continues with repeated execution of third, fourth, and fifth steps. For convenience, these steps will collectively be referred to as "the loop."

The third step is that of receiving measurements representative of the direction of displacement of the device and of the amplitude of this displacement from its previous position. These measurements are carried out by sensors onboard the displaced device. These sensors are real physical structures that are not abstract in any way.

The fourth step is that of updating the coordinates of the position of each particle. This updating procedure is carried out as a function of both the measurements received during the third step and also of a predetermined displacement law for displacing this particle from its previous position $P^i_{k-1}$ to a new position $P^i_k$ in a manner correlated with the measured displacement of the device. Each displacement law comprises at least a first measured variable whose value is dependent on the measurement of the direction of displacement received during the third step and a second measured variable whose value is dependent on the measurement of the amplitude of this displacement received during the third step.

The fifth step includes making a decision as to whether a particle's weight should be increased relative to those of other particles. For each particle, if the latest displacement of that particle from the position $P^i_{k-1}$ to the position $P^i_k$ satisfies the predefined constraints, the weight associated with that particle is increased with respect to the weights of the particles whose latest displacement fails to comply with these predefined constraints.

After repetition of the loop, a sixth step includes estimating the device's position on the basis of the positions of the particles and of the weights associated with these particles. This estimation is carried out, in part, by allotting more importance to the positions of the particles associated with the highest weights.

In carrying out the foregoing procedure, there exists a tendency for the position of the second particles to diverge further from the device's real position during the course of iterating the loop. Conversely, the position of the first particles remains close to the real position of the device.

Consequently, it is probable that a displacement of a second particle will rapidly violate one or more of the predefined constraints on the displacements in the three-dimensional environment. Hence, as iteration of the loop proceeds, the weight of the second particles rapidly becomes less important than that of the first particles. The determination of the device's position of the device is then carried out on the basis of a certain number of iterations of the loop by giving more importance to the positions of the first particles than to the positions of the second particles.

However, the positions of the first particles are obtained by compensating the bias more correctly. Thus, an estimate of the device's position using the foregoing method rapidly becomes more precise than it would have been had the bias not been corrected.

The foregoing method is a non-abstract method that results in an improvement in a particular technology, namely the technology of device location. The nature of the improvement can be understood from a recitation of some of the advantages thereof.

A particular advantage of the method is that this increased precision comes with no need for prior calibration. In fact, as the loop's iteration proceeds, the corrective factor, which is what makes it possible to more precisely compute a particle's position, is selected automatically. Since this corrective factor is arrived at more or less concurrently with estimating the device's position, the corrective factor is also less likely to be out of date.

Among the advantages of the method described herein is that applying the corrective factor to the measured variable corresponding to the amplitude of the displacement of the device makes it possible to automatically correct a bias in the amplitude of the displacement of this device.

Also among the advantages is that applying the corrective factor to a measured variable corresponding to the direction of the displacement of the device makes it possible to automatically correct a bias in the direction of displacement.

Also among the advantages is that generating new particles and also associating these new particles with initial values for the corrective factor that are close to the corrective factor's current values associated with the particles that have not been eliminated makes it possible to increase the precision of the estimate of the value of the corrective factor and therefore of the position of the device as the iteration of the loop proceeds.

Yet another advantage is that using, in the guise of predefined constraints, the existence of obstacles, which are impassable to the device in the three-dimensional environment, makes it possible to accelerate the convergence of the location method of location toward a precise estimate of the device's position.

Yet another advantage is that dividing the map into several zones and associating, with each of these zones, a list of identifiers of impassable obstacles contained inside that zone makes it possible to retain a simple tiling of the map into several zones while being capable of using impassable obstacles situated entirely inside these zones.

Yet another advantage arises from dividing the map into several zones and associating, with each of these zones, the displacement law that makes it possible to estimate the displacement of the device in that zone with greater precision than would have been possible had another displacement law associated with another zone been used. This makes it possible to increase the precision with which the device's position can be estimated.

Yet another advantage arises from using a favored direction of displacement in a zone of the map to change the weight associated with a particle. This makes it possible to converge more rapidly toward a precise estimate of the position of the device.

In some aspects, the invention further includes a non-transitory information-recording medium that has, encoded thereon, instructions for the execution of the above method of location when these instructions are executed by an electronic computer in a non-abstract manner.

In yet another aspect, the invention features an electronic locating unit configured to implement the foregoing method in a non-abstract manner.

In another aspect, the invention features a device that is directly transportable by a pedestrian who is moving through a three-dimensional space. Such a device is a non-abstract physical device that is made of matter and that includes an inertial platform able to measure physical quantities representative of the direction of displacement of this device and of the amplitude of this displacement and the electronic locating-unit configured in the manner already described.

All methods and devices described herein are described in their non-abstract forms. Descriptions of abstract forms have been omitted. The claims are understood to cover only non-abstract subject matter. As used herein, the term "non-abstract" is the converse of "abstract" as that term has been interpreted by the U.S. Supreme Court and the Federal Circuit as of the priority date of this application.

The invention will be better understood on reading the description which follows, given solely by way of non-limiting example and while referring to the drawings, in which:

BRIEF DESCRIPTION OF THE DRAWINGS

FIG. 1 is a vertical sectional schematic illustration of a building inside which is implemented a device-locating method;

FIG. 2 is a schematic illustration of a device for implementing the device-locating method;

FIG. 3 is a schematic illustration of a map used to locate the device of FIG. 2 in the building of FIG. 1;

FIG. 4 is a flowchart of a device-locating method as implemented by the device of FIG. 2.

In these figures, the same references are used to designate the same elements. Hereinafter in this description, the characteristics and functions that are well known to the person skilled in the art are not described in detail.

DETAILED DESCRIPTION

FIG. 1 shows a multi-story building 2 inside of which a pedestrian 4 walks freely. For ease of exposition, only a ground-floor story 6 and a first story 8 are represented. Story-changing zones link stories together. Examples include a staircase or an elevator.

Each story comprises rooms and corridors delimited by walls that the pedestrian 4 cannot cross. The pedestrian 4 enters a room only by passing through a door. A room's interior can also comprise obstacles that are impassable to the pedestrian 4. Examples of such obstacles include pillars or other construction elements of the building 2.

A pedestrian 4 holds a device 10 while walking around the building 2. The device 10 locates itself on a map of the building 2 without recourse to sensors other than those that it comprises internally. In particular, the device 10 charts its position inside the building 2 without using a navigation system that calls upon external charting beacons implanted in the environment of the building 2. These external beacons can be satellites or radio-wave emitters fixed to the building 2. In particular, the device 10 charts its position without recourse to a GPS ("Global Positioning System").

FIG. 2 represents the device 10 in greater detail. The device 10 comprises an electronic locating-unit 11 that comprises a memory 12 and a programmable electronic computer 14 capable of executing instructions recorded in the memory 12. The memory 12 comprises instructions necessary for executing the method of FIG. 4. In addition, the memory 12 comprises a map 16 of the building 2. This map is described in greater detail with reference to FIG. 3.

The device 10 also comprises an inertial platform 17. The inertial platform 17 uses a bus 19 to transmit data to the computer 14. This data includes measurements of the direction in which the device 10 is moving and of the amplitude of the displacement in this direction from the latest logged position of this device 10. A typical inertial platform 17 comprises a three-axis accelerometer 18, a gyrometer 19, and a three-axis magnetometer 20. In some embodiments, the inertial platform 17 also comprises a barometer 21 for measuring the altitude of the device 10.

The device 10 also includes a screen 24 that makes it possible to display a graphical representation 26 of the map 16 on which a point PA representing the current position of the pedestrian 4 inside the building 2. This point PA is therefore situated in the graphical representation 26 at the site of the map 16 corresponding to the current position of the device 10, and therefore, of the pedestrian 4.

In some embodiments, the device 10 is a smartphone or an electronic tablet 2 programmed to execute the method of FIG. 4.

FIG. 3 graphically represents the content of the map 16 for the story 8 of the building 2. What will now be described in respect of the story 8 of the building 2 applies to each story of this building and to the ground floor story 6.

The map 16 comprises several zones 30 . . . 35 that collectively tile the entire story 8. In the illustrated embodiment, each zone is a polygon.

The zones are parallel to the story's floor and coplanar with a plane referred to herein as the "story plane." The story plane is typically horizontal.

The zones 30 . . . 35 are contiguous and non-overlapping zones. However, to increase the readability of FIG. 3, the zones 30 . . . 35 are represented as overlapping. Thus, each portion of the periphery of each zone is common with at most one portion of the periphery of another different zone.

In a typical implementation, the edges of each zone are at the site of an obstacle that is impassable to the pedestrian 4 such as a wall. However, in some cases, one and the same zone can encompass several rooms of the building 2. An example is the zone 33, which surrounds a room 40 and another smaller room 42.

In FIG. 3, walls, which are shown as thin lines, delimit the periphery of each room. Moreover, each room comprises at least one opening for accessing the room's interior. In FIG. 3, the openings are between the wall ends marked by points. A typical opening is a door.

A zone can also encompass impassable obstacles in the room's interior. Examples of such impassable obstacles include an interior partition, a pillar, or any other element of the building 2 that a pedestrian 4 cannot cross. Zone 31, which comprises partitions 44, 46 situated inside a room 48, provides an example of such a zone.

For each polygonal zone, the map 16 contains an identifier for that zone and the coordinates of the vertices of the polygon that defines that zone. These coordinates are typically given in an XYZ frame.

The XYZ frame is an orthogonal frame in which the X and Y directions are horizontal and the Z direction is vertical. In the illustrated embodiment, each zone is rectangular. As a result, it is possible to economize on memory by only storing the coordinates of a zone's two diagonally opposite vertices.

For each zone, the map 16 also comprises a list of identifiers of just the impassable obstacles situated inside that zone or on the periphery of that zone and another identifier that identifies a law of displacement within that zone. In some embodiments, the map also includes a favored direction of displacement.

A horizontal segment contained in the plane of the floor codes the position and the dimensions of each impassable object. Thus, each obstacle identifier is associated with a pair of points $E_{jd}$ and $E_{jf}$. The points $E_{jd}$ and $E_{jf}$ mark, respectively, the start and the end of a segment $[E_{jd}; E_{jf}]$, where j is the identifier of the impassable obstacle. The coordinates of the points $E_{jd}$ and $E_{jf}$ in the plane of the floor are known and contained in the map 16. In the illustrated embodiment, the zone 31 comprises eight obstacle identifiers $IdO_1$ . . . $IdO_8$. The identifiers $IdO_1$ to $IdO_8$ correspond, respectively, to the segments $[E_a; E_b]$; $[E_b; E_c]$; $[E_c; E_d]$; $[E_d; E_f]$; $[E_f; E_g]$; $[E_h; E_i]$; $[E_j; E_R]$ and $[E_p; E_m]$. FIG. 3 illustrates the position of the points $E_a$ to $E_m$.

Each displacement law makes it possible to compute, on the basis of the measurements of the inertial platform 17 at an instant $t_k$, the displacement of a particle $S^i$ from a previous position $P^i_{k-1}$ to a new position $P^i_k$. This displacement is directly correlated with that of the device 10. Typically, this displacement between the positions $P^i_{k-1}$ and $P^i_k$ is identical or very close to that of the device 10 between the instants $t_{k-1}$ and $t_k$. Subsequently, the superscript "i" is the identifier of the particle and the subscript "k" is the order number of the instant at which the direction and the amplitude of the displacement of the device 10 are measured.

The inertial platform 17 measures an angle $\theta_k$, in the plane of the story, between the device's direction of displacement and the X direction. In some embodiments, the inertial platform 17 relies on measurements from the gyrometer 19 and from the magnetometer 20 to obtain such a measurement. The direction measured at the instant $t_k$ will be referred to herein as "direction $\theta_k$".

The inertial platform 17 further provides a physical quantity representative of the amplitude $l_k$ of the displacement of the device 10 in the direction $\theta_k$ between the instants $t_{k-1}$ and $t_k$. For this purpose, it is possible to integrate the measurement of the accelerometer 18 between the instants $t_{k-1}$ and $t_k$ and, if the measurement is zero, to retain the previous measured speed $v_{k-1}$.

In the case of a pedestrian 4 walking on a horizontal floor, it is possible to obtain a more precise estimate of the amplitude $l_k$ by having the computer 14 detect, on the basis of the measurements provided by the accelerometer 18, the instant at which a pedestrian's foot contacts the floor. On the basis of these successive instants, the computer 14 computes a frequency $f_k$ of the pedestrian's footsteps.

Next, the computer 14 computes an amplitude $l_k$ of the pedestrian's displacement in the direction $\theta_k$. It does so by using the following footstep model: $l_k = Af_k + BT + C$, where A, B, C and T are constants that are independent of the measurements of the inertial platform 17. The constants A, B, and C are independent of the pedestrian's morphological characteristics. The constant T is equal to the pedestrian's height 4. By default, the constant T is the mean height of a human being, for example 1.78 meters.

The device's speed $v_k$ between the instants $t_{k-1}$ and $t_k$ is obtained by evaluating the expression: $v_k = l_k / \Delta t$, where $\Delta t$ is the duration of the time interval between the instants $t_{k-1}$ and $t_k$. Typically, $\Delta t$ is chosen equal to the duration between a pedestrian's footsteps.

Thus, when the pedestrian 4 moves by walking on the floor of the story 8, a displacement law is given by the following relations:

$$x^i_k = x^i_{k-1} + v_k \cdot \Delta t \cdot \cos(\theta_k);$$

$$y^i_k = y^i_{k-1} + v_k \cdot \Delta t \cdot \sin(\theta_k)$$

where $(x^i_k, y^i_k)$ and $(x^i_{k-1}, y^i_{k-1})$ are the coordinates, in the plane of the floor, of the positions $P^i_k$ and $P^i_{k-1}$ of the particle $S^i$.

In the case of a method of location of the device 10 implementing a particle filter, it is beneficial to explore the largest possible number of trajectories with the particles. Thus, the displacement of each particle is disturbed in a random manner. An example of a usable displacement law is the following:

$$x^i_k = x^i_{k-1} + v_k \cdot \Delta t \cdot \cos(\theta_k + \mu^i_x);$$

$$y^i_k = y^i_{k-1} + v_k \cdot \Delta t \cdot \sin(\theta_k + \mu^i_y);$$

where $\mu^i_x$ and $\mu^i_y$ are random variables.

At each instant $t_k$ and for each particle $S^i$, the values of the random variables $\mu^i_x$ and $\mu^i_y$ are randomly drawn as a function of a predefined centered probability distribution, i.e., one with an expectation of zero. Thus, the mean of the values of each random variable $\mu^i_x$ and $\mu^i_y$ at the various successive instants $t_k$ tends to zero as k increases.

In some embodiments, the predefined probability distribution is the same for both random variables $\mu^i_x$ and $\mu^i_y$ and for all the particles $S^i$. Such a distribution, or "law," is denoted $Lp_{xy}$. This probability distribution $Lp_{xy}$ is characterized by a predetermined standard deviation $\sigma_{xy}$. Embodiments include those in which the probability distribution $Lp_{xy}$ is a uniform distribution and those in which it is a Gaussian distribution.

In the illustrated embodiment, the standard deviation $\sigma_{xy}$ is constant and independent of the measurements of the inertial platform 17 for updating at each footstep. In some embodiments, the standard deviation $\sigma_{xy}$ is greater than five centimeters. In others, it is greater than ten centimeters and, preferably, less than thirty-five centimeters.

In some cases, there also exists a direction bias. A direction bias is a bias in the measurement of the direction $\theta_k$. A direction bias may originate from a defect in the sensors of the inertial platform 17. A direction bias can also arise from the pedestrian 4 having rotated the device 10 in a horizontal plane.

In some cases, there also exists a footstep bias. The footstep bias is a bias in the measurement of the amplitude $l_k$ of the device's displacement. Like the direction bias, the footstep bias can originate from a defect in the sensors of the inertial platform 17. Or, the footstep bias can originate from a modeling error and, in particular, an error in the default value of the coefficient T in the footstep model. One source of footstep bias arises from not knowing the pedestrian's actual height. Thus, a deviation in the pedestrian's height from average human height of 1.78 meters introduces a systematic footstep bias in the measurement of the amplitude $l_k$.

Typically, these biases are constant at least over a time interval that is long enough to be able to estimate them.

To compensate and correct for direction and footstep biases, the displacement law used integrates corrective factors $\alpha^i$ and $\varepsilon^i$, associated with each particle $S^i$. In one example, the displacement law is given by the following relations:

$$x^i_k = x^i_{k-1} + v_k \cdot \Delta t \cdot (1+\varepsilon^i_k) \cdot \cos(\theta_k + \alpha^i_k) + \mu^i_x;$$

$$y^i_k = y^i_{k-1} + v_k \cdot \Delta t \cdot (1+\varepsilon^i_k) \cdot \sin(\theta_k + \alpha^i_k) + \mu^i_y;$$

$$\varepsilon^i_k = \varepsilon^i_{k-1} + \mu^i_\varepsilon;$$

$$\alpha^i_k = \alpha^i_{k-1} + \mu^i_\alpha;$$

where $\varepsilon^i_k$ and $\varepsilon^i_{k-1}$ are the values, respectively at the instants $t_k$ and $t_{k-1}$, of the corrective factor $\varepsilon^i$ used to correct the footstep bias, $\alpha^i_k$ and $\alpha^i_{k-1}$ are the values, respectively at the instants $t_k$ and $t_{k-1}$, of the corrective factor $\alpha^i$ used to correct the direction bias, and $\mu^i_\varepsilon$ and $\mu^i_\alpha$ are random variables.

The random variables $\mu^i_\varepsilon$ and $\mu^i_\alpha$ are used for the same reasons and in the same manner as the variables $\mu^i_x$ and $\mu^i_y$ introduced previously. Thus, a new value of the variables $\mu^i_\varepsilon$ and $\mu^i_\alpha$ is randomly drawn at each new instant $t_k$ and for each particle $S^i$ as a function, respectively, of a predefined probability distributions $Lp_\varepsilon$ and of a predefined probability distributions $Lp_\alpha$. Typically, these probability distributions $Lp_\varepsilon$ and $Lp_\alpha$ are the same for all the particles $S^i$. In the illustrated embodiment, the mathematical expectations of the probability distributions $Lp_\varepsilon$ and $Lp_\alpha$ are equal to zero. Consequently, just as for the random variables $\mu^i_x$ and $\mu^i_y$, the mean of the values of each random variable $\mu^i_\varepsilon$ and $\mu^i_\alpha$ at the various successive instants $t_k$ tends to zero as k increases.

The variables $\mu^i_\varepsilon$ and $\mu^i_\alpha$ only slightly disturb the previous values $\varepsilon^i_{k-1}$ and $\alpha^i_{k-1}$ of the corrective factors $\varepsilon^i$ and $\alpha^i$. As a result the values of the corrective factors $\varepsilon^i$ and $\alpha^i$ remain stable over time. For this purpose, the standard deviations $\sigma_\varepsilon$ and $\sigma_\alpha$, respectively, of the probability distributions $Lp_\varepsilon$ and $Lp_\alpha$ do not allow a fast variation of the values of the corrective factors $\varepsilon^i$ and $\alpha^i$. As a result, it is desirable to choose the standard deviation $\sigma_\varepsilon$ to be small enough to keep the ratio $\Sigma\sigma_{\varepsilon k}/T$ to be less than ten percent per second and, preferably, less than five percent per second or one percent per second, where: $\sigma_{\varepsilon k}$ is the standard deviation of the distribution $Lp_\varepsilon$ during the $k^{th}$ iteration of an updating step 96, $\Sigma\sigma_{\varepsilon k}$ is the sum of the standard deviations $\sigma_{\varepsilon k}$ between the $q^{th}$ iteration and the $p^{th}$ iteration of the updating step 96, where q is an integer that is less than p, and T is the duration, in seconds, of the time interval which has elapsed between the $q^{th}$ and the $p^{th}$ iteration of updating step 96.

The updating step 96 is one in which the coordinates of the particle $S^i$ are updated. This step is described in greater detail with reference to FIG. 4.

In the embodiment described herein the standard deviation $\sigma_\varepsilon$ is constant. Thus, the previous ratio can also be written: $(p-q)\sigma_\varepsilon/T$. In this case, whatever p and q might be, the ratio is constant. The difference p−q is generally large enough to cover a time period of greater than one second or four seconds and, generally, less than ten minutes or five minutes or one minute. For example, this difference between p and q is constant whatever p.

In a similar manner, the standard deviation $\sigma_\alpha$ is chosen to be small enough to keep the ratio $\Sigma\sigma_{\alpha k}/T$ less than ten degrees per second and, preferably, less than five degrees per second or one degree per second, where: $\sigma_{\alpha k}$ is the standard deviation of the probability distribution $Lp_\alpha$ during the $k^{th}$ iteration of the updating step 96, $\Sigma\sigma_{\alpha k}$ is the sum of the standard deviations $\sigma_{\alpha k}$ between the $q^{th}$ iteration and the $p^{th}$ iteration of the updating step 96, where q is an integer strictly less than p, and T is the duration, in seconds, of the time interval that has elapsed between the $q^{th}$ and the $p^{th}$ iteration of updating step 96.

The standard deviation $\sigma_\alpha$ is also constant. Thus, the previous ratio can also be written: $(p-q)\sigma_\alpha/T$.

Just as for the variables $\mu^i_x$ and $\mu^i_y$, the variables $\mu^i_\varepsilon$ and $\mu^i_\alpha$ make it possible to explore a large number of possible values for the corrective factors $\varepsilon^i$ and $\alpha^i$.

The displacement law described hereinabove will be referred to herein as the first displacement law. This first displacement law operates in most situations where the pedestrian 4 walks on horizontal ground.

On the other hand, in certain cases, there exist other, more precise, displacement laws.

For example, in a stairwell zone 35 that covers a stairwell comprising a staircase 50, the length of the pedestrian's footsteps depends on the depth $L_m$ of each step of the staircase 50. Thus, in the stairwell zone 35, it would be preferable to use a second displacement law that takes this into account.

In some embodiment, a suitable second displacement law is identical to the first displacement law except that the product $v^i_k \cdot \Delta t \cdot (1+\varepsilon^i_k)$ is replaced with the measured variable $n^i_k$. The variable $n^i_k$ is given by the following relation: $n^i_k = (\text{Ent}(|z^i_k - z^i_{k-1}|/H_m)) \cdot L_m$, where: $z^i_{k-1}$ and $z^i_k$ are the heights of the device 10 measured by the inertial platform 17 at the instants $t_{k-1}$ and $t_k$, respectively, $H_m$ is the constant height of a stair of the staircase 50, $L_m$ is the depth of a stair of the staircase 50, $|z^i_k - z^i_{k-1}|$ is the absolute value of the difference between $z^i_k$ and $z^i_{k-1}$, and Ent ( . . . ) is a function that returns the integer part of its argument. The height $H_m$ and the depth $L_m$ are known in advance and recorded in the map 16. The values of the measured variables $z_k$ and $z_{k-1}$ are obtained, typically, on the basis of the measurements by the barometer 21. In this case, only the stairwell zone 35 relies on the second displacement law. All the other zones of the story 8 remain associated with the first displacement law.

Within the building 2, there exist zones 30, 31, 33 and 34 in which a pedestrian 4 moves freely in all directions. Stated otherwise, within these zones, all displacement directions are equally probable. In this particular example, the zones have no favored direction of displacement.

Conversely, there also exist zones of the building 2 in which not all displacement directions are equally probable.

For example, a corridor zone 32 spans a long corridor parallel to the X direction. In this corridor zone 32, a pedestrian's most probable displacement would be parallel to the X direction. In fact, it would be rather improbable for the pedestrian 4 to move transversely to the corridor's longitudinal direction. In this case, there is said to be a favored displacement direction in the corridor zone 32.

Each favored direction is coded by an angle $\gamma$ in the plane of the floor between this favored direction and the X direction. Moreover, in this embodiment, an angular tolerance $\sigma_\gamma$ is also associated with each favored direction. This angular tolerance is generally expressed in degrees or in radians. For example, in the case of the corridor zone 32, the angle $\gamma$ is equal to zero degrees and the angular tolerance $\sigma_\gamma$ is ±30°. In the embodiment described here, the stairwell zone 35 is also associated with a favored direction for ascending and descending the staircase 50. For this favored direction, the angle $\gamma$ is equal to ninety degrees and the angular tolerance $\sigma_\gamma$ is equal to ±20°.

Referring now to FIG. 4, the device 10 begins the process of locating itself within a building 2 by having the unit 11 implement a location algorithm. This location algorithm is referred to herein as a "particle filter."

The method's first step 90 occurs upon triggering the location algorithm. This might occur, for example, when a pedestrian 4 interacts with the device's user interface.

The computer 14 begins by generating an initial assembly of $N_0$ particles $S^i$, where i is an identifier of the particle making it possible to distinguish it from among the set of other particles generated. The number $N_0$ of particles $S^i$ depends on the initial knowledge that one has about the position of the device 10 in the building 2 and the area of the building. Typically, $N_0$ is greater than ten or a hundred and less than five thousand or one thousand.

Each particle $S^i$ is initially associated with an initial position $P^i_0$ inside the building 2. The position $P^i_0$ comprises the coordinates $x^i_0$, $y^i_0$ and $z^i_0$ of the particle $S^i$ in the XYZ frame, with an initial value $w^i_0$ of the weight $w^i$ representing the probability that the device 10 is situated at the site of this particle $S^i$ at the instant $t_0$, with an initial value of $\alpha^i_0$ for the corrective factor $\alpha^i$, and with an initial value of $\varepsilon^i_0$ for the corrective factor $\varepsilon^i$.

The first step 90 also include initializing the initial position $P^i_0$ and the variables $w^i_0$, $\alpha^i_0$, and $\varepsilon^i_0$ with their respective initial values. Numerous methods for initializing the positions $P^i_0$ and the weights $w^i_0$ of each particle are possible. For example, if the initial position of the device 10 is known to within one meter, the positions $P^i_0$ of all the particles $S^i$ are drawn at random inside a circle centered on the known position and having a one-meter radius. It is also possible to set each weight $w^i_0$ to be equal to $1/N_0$, where $N_0$ is the initial number of particles generated.

Each value $\alpha^i_0$ is drawn at random in such a way that the distribution of the initial values $\alpha^i_0$ follows a predetermined probability distribution $Lp_{\alpha 0}$, such as a uniform distribution, a Gaussian distribution, or some other distribution. The probability distribution $Lp_{\alpha 0}$ is generally not the same as the probability distribution $Lp_\alpha$ that is used to obtain the values of the random variable $\mu^i_\alpha$.

The a priori knowledge that one has about the distribution of the direction bias makes it possible to choose the probability law for the initial values $\alpha^i_0$ that most resembles the one observed. It is also this a priori knowledge that makes it possible to fix the value of the standard deviation $\sigma_{\alpha 0}$ of the distribution $Lp_{\alpha 0}$.

In some embodiments, the standard deviation $\sigma_{\alpha 0}$ is chosen to be equal to 360° if one has no information about the direction bias. In other embodiments, the standard deviation $\sigma_{\alpha 0}$ is chosen to be less than 45° if one has only limited information about the direction bias. A particular property of the probability distribution $Lp_{\alpha 0}$ is that it does not necessarily have a zero mean.

Each initial value $\varepsilon^i_0$ is chosen as described previously for the initial values $\alpha^i_0$ except that a predefined probability distribution $Lp_{\varepsilon 0}$ is used for the footstep bias instead of the distribution $Lp_{\alpha 0}$. Moreover, the probability distribution $Lp_{\varepsilon 0}$ is not necessarily identical to the distribution $Lp_{\alpha 0}$. Indeed, generally, the direction bias and footstep bias are not correlated.

Typically, the standard deviation $\sigma_{\varepsilon 0}$ of the distribution $Lp_{\varepsilon 0}$ is equal to 30%±5% if one has no information about the footstep bias. In some embodiments, the standard deviation $\sigma_{\varepsilon 0}$ is chosen to be less than 20% if one has only a little information about the footstep bias.

During a second step 92, the inertial platform 17 transmits its measurements to the computer 14. After having received these measurements, the computer 14 uses them to compute the speed $v_k$ and the angle $\theta_k$ of the current displacement of the device 10 from its latest position. The new measurements of the speed $v_k$ and of the angle $\theta_k$ are computed each time that the computer 14 detects that the pedestrian's foot has just touched the floor.

During a third step 94, the computer 14 identifies, for each particle $S^i$, the zone inside which that particle is currently situated. In some embodiments, for each particle $S^i$, the computer 14 compares its last-known position $P^i_{k-1}$ with the periphery of each zone of the map 16.

For example, in the case of rectangular zones aligned with the XYZ frame, the computer 14 tests whether the following two inequalities are satisfied: $x_{Aj} \leq x^i_{k-1} \leq x_{Bj}$ and $y_{Aj} \leq y^i_{k-1} \leq y_{Bj}$, where: the subscript j is an identifier of the zone of the map 16 making it possible to distinguish it from the other zones, $x_{Aj}$ and $y_{Aj}$ are the coordinates of that vertex of zone j which is closest to the origin of the XYZ frame, and $x_{Bj}$ and $y_{Bj}$ are the coordinates of that vertex of zone j that is furthest from the origin of the XYZ frame.

If these two inequalities are satisfied, then the particle $S^i$ belongs to zone j. Preferably, the computer 14 first tests whether the particle $S^i$ has remained in the same zone. A finding that the particle $S^i$ does not belong to any zone triggers additional processing. In some cases, such a finding causes the computer 14 to eliminate that particle.

During the fourth step 96, once the zone to which each particle $S^i$ belongs has been identified, each particle is displaced in a manner correlated with the measured displacement of the device 10 from its previous position $P^i_{k-1}$ up to a new position $P^i_k$. Accordingly, the coordinates of each particle $S^i$ are updated as a function of three variables, namely: the latest measurements received from the inertial platform 17, the coordinates of the previous position $P^i_{k-1}$ of this particle, and the displacement law associated with the zone inside which the particle $S^i$ is situated. For this reason, the fourth step 96 is often called an "updating step."

The displacement law to be used is therefore that associated with the zone identified during the third step 94.

For example, if the particle $S^i$ is situated inside one of the zones 30 ... 34, then the coordinates of the new position $P^i_k$ are established using the first displacement law. On the other hand, if the particle $S^i$ is situated inside the zone 35, then the coordinates of the new position $P^i_k$ are established using the second displacement law.

At each new execution of the updating step 96, the new values for the variables $\mu^i_x$, $\mu^i_y$, $\mu^i_\alpha$ and $\mu^i_\epsilon$ are randomly drawn with the aid of the laws $Lp_{xy}$, $Lp_\alpha$ and $Lp_\epsilon$, respectively.

During a fifth step 98, the computer 14 updates the weights $w^i$ of each particle $S^i$. More precisely, the computer 14 decreases the weight $w^i$ of the particle $S^i$ if its latest displacement from the position $P^i_{k-1}$ to the position $P^i_k$ is inconsistent with predefined constraints associated with the zone inside which it is situated.

Typically, for each particle $S^i$, the computer 14 verifies that first and second constraints have been met. The first constraint is that the segment $[P^i_{k-1}; P^i_k]$ must not cross an impassable obstacle of the zone inside which the particle $S^i$ is situated. The second constraint is that the displacement direction from the position $P^i_{k-1}$ to the position $P^i_k$ complies with the favored displacement direction associated with the zone inside which the particle $S^i$ is situated.

In some embodiments, a constraint on the displacement of the particle $S^i$ is defined as being a condition that, if satisfied by the particle $S^i$, increases the weight $w^i$ of that particle $S^i$ with respect to the weight of the particles that do not satisfy this condition. Conversely, if this condition is not satisfied by the particle $S_i$, then the condition decreases the weight $w^i$ of the particle $S^i$ relative to the weights of the particles that did satisfy the condition.

To evaluate the first constraint, for each particle $S^i$, the computer 14 searches for whether there exists an intersection between the segment $[P^i_{k-1}; P^i_k]$ and each impassable obstacle of the zone inside which the particle is situated. This zone was identified during third step 94. This intersection search is carried out solely with the impassable obstacles whose identifiers are contained in the list associated with the identified zone. Since each obstacle is coded by a segment, this intersection search amounts to a search for an intersection between two segments.

If an intersection exists, then a very low value or a value of zero is assigned to the weight $w^i$. An example of a very low value is a value less than 0.2 or 0.1. In the converse case, the value of the weight $w^i$ remains unchanged.

If the zone inside which the particle $S^i$ is situated is not associated with a favored direction, then the second constraint is not used to update the weight $w^i$. In the converse case, the second constraint is used.

To evaluate the second constraint, the computer 14 computes a weight $w^i_\theta$ on the basis of the deviation between the measured direction $\theta_k$ for the displacement of the particle $S^i$ and the favored direction of the zone inside which it is situated. The value of the weight $w^i_\theta$ grows larger as the angular deviation between the favored direction γ and the direction of displacement from the position $P^i_{k-1}$ to $P^i_k$ grow smaller. The value of the weight $w^i_\theta$ is established while taking account of the tolerance $\sigma_\gamma$ associated with this favored direction. The value of the weight $w^i_\theta$ is therefore larger if the angular deviation between the direction of displacement of the particle $S^i$ and the favored direction lies in the tolerance margin defined by the value of $\sigma_\gamma$ and, in the converse case, the value of the weight $w^i_\sigma$ is smaller.

In some embodiments, the value of the weight $w^i_\sigma$ is computed with the following relation: $w^i_\sigma = p \cdot \exp[(\theta_k + \alpha^i_k - \gamma)^2/(2\sigma_\gamma^2)]$, where p is a predefined constant coefficient. The value $\alpha^i_k$ of the corrective factor $\alpha^i$ of the direction bias is also used to compute this weight $w^i_\sigma$.

Thereafter, the value of the weight $w^i$ is set equal to its previous value multiplied by the value of the weight $w^i_\theta$ thus obtained.

During a sixth step 100, the computer 14 normalizes the weights $w^i$ of all the particles $S^i$ so that the sum of all these weights is equal to unity. In some embodiments, the computer 14 computes the sum W of all the weights $w^i$ and then divides each weight $w^i$ by the sum W.

During a seventh step 102, which is a resampling step, the computer 14 re-samples the particles $S^i$. The seventh step 102 includes eliminating those particles whose weights $w^i$ have become too low to replace them with particles associated with parameters whose weights are higher.

Numerous re-sampling techniques are known. For example, here, we apply the SIR (Sequential Importance Resampling) scheme described in the following book: B. Ristic, S. Arulampalam, N. Gordon, "Beyond the Kalman Filter, particle filter for tracking applications," Artech House, 2004.

The re-sampling scheme includes classifying the particles into two groups: the particles to be regenerated and the surviving particles. The particles to be regenerated are those whose weight is below a predetermined threshold. All other particles are surviving particles.

Thereafter, for each particle to be regenerated, the computer 14 eliminates the old particle and then generates a new particle to replace it. To generate a new particle, the computer 14 randomly draws a particle from the group of surviving particles. This random drawing is carried out preferably in such a way that the probability of being drawn is proportional to the weight of the surviving particle.

Thereafter, the drawn surviving-particle's position $P^i_k$ and its values $\alpha^i_k$ and $\varepsilon^i_k$ are assigned to the newly-generated particle. During this step, the computer 14 adds a random disturbance to the position and to the values of the corrective factors. In some embodiments, it does so by using the random variables $\mu_x$, $\mu_y$, $\mu_\alpha$ and $\mu_\varepsilon$. However, these disturbances are calibrated in such a way that the values $\alpha^i_k$ and $\varepsilon^i_k$ assigned to the generated particle remain close to the current values for the corrective factors associated with the recently drawn surviving-particle. Typically, the mean of the values $\alpha^i_k$ that are assigned to the generated particles are closer to the mean of the values $\alpha^i_k$ of the surviving particles than to the mean of the values $\alpha^i_k$ of the eliminated particles. The same holds for the values $\varepsilon^i_k$ assigned to the generated particles.

A new weight is also assigned to each generated particle and, optionally, to the surviving particle from which it arises.

During an eighth step 104, the computer 14 estimates the position PA of the device 10 on the basis of the positions $P^i_k$ and of the weights $w^i$ of all the particles $S^i$. Numerous schemes are possible for doing this. For example, the position PA is taken equal to that of the particle $S^i$ having the highest weight $w^i$. In another embodiment, the position PA is taken equal to the mean of the positions $P^i_k$ of the particles $S^i$ on weighting each position $P^i_k$ by the weight $w^i$. Another scheme is also described in application WO 2012158441.

Finally, during a ninth step 106, a point is displayed at the position PA on the graphical representation 26 of the map 16 to indicate to the pedestrian 4 his position on this map and therefore his position inside the building 2.

The steps between the second step 92 and the ninth step 106 inclusive define a loop that repeatedly executes. As these iterations proceed, the precision of the estimate of the position of the device 10 increases. It does so because only the most probable positions $P^i_k$ are retained.

In parallel with the eighth step 104, during a tenth step 108, the computer 14 computes an estimate $E_\alpha$ of the direction bias and an estimate $E_\varepsilon$ of the footstep bias on the basis, respectively, of the current values $\alpha^i_k$ and $\varepsilon^i_k$ of the particles $S^i$. In some embodiments, the estimate $E_\alpha$ is set equal to the mean of the current values $\alpha^i_k$ of all the particles $S^i$. In a similar manner, the value of the estimate $E_\varepsilon$ is set equal to the mean of the current values $\varepsilon^i_k$ of all the particles $S^i$.

The precision of the estimates $E_\alpha$ and $E_\varepsilon$ increases as the repetitions of the loop proceed. Indeed, it is probable that the particle $S^i$ associated with an incorrect current value for the corrective factor $\alpha^i$ or $\varepsilon^i$ will rapidly fall out of compliance with the constraints that were evaluated during a fifth step 98. Hence, the particles $S^i$ associated with incorrect current values for the corrective factors are preferably eliminated during the seventh step 102. Thus, as the loop iterates, the particles $S^i$ associated with correct current values for the corrective factors are preferentially selected as surviving particles during the seventh step 102. Hence, the estimates $E_\alpha$ and $E_\varepsilon$ converge toward the actual values of the direction bias and the footstep bias.

Moreover, since the values of the corrective factors $\alpha^i$ and $\varepsilon^i$ converge toward the actual values of the direction and footstep biases as the loop iterates, the corrective factors correct these direction and footstep biases with increasing precision. Hence, the presence of these corrective factors in the displacement law makes it possible to substantially increase the precision of the estimate of the position PA even in the presence of such direction and footstep biases.

The estimates $E_\varepsilon$ and $E_\alpha$ can be displayed on the screen 24 or used by other applications to correct the direction and footstep biases.

Numerous other embodiments are possible.

For example, some embodiments feature sensors that provide a mean value of the variable measured at an instant k as well as a standard deviation in that measurement. In this case, the measured values of the angle $\theta_k$ and of the amplitude $l_k$ are obtained by drawing the values at random using a Gaussian probability distribution whose mean and standard deviation are equal to those transmitted by the sensors. This makes it possible to take measurement noise into account.

Embodiments include those in which the pedestrian 4 carries the device 10 and those in which the pedestrian pushes a trolley on which the device 10 has been mounted.

The latter case includes embodiments that measure speed $v_k$ by integrating the acceleration measured by the trolley and those that estimate speed by detecting detect a frequency of the impacts that occur each time a wheel of the trolley rolls over a joint between regular interruptions on pavement, such as in the interruption between flagstones or paving stones.

In some embodiments, a motorized robot transports the device 10 without the aid of the pedestrian 4. In this case, the amplitude of the displacement can be measured by measuring the number of wheel revolutions of a driving wheel of the robot.

The method described above applies to any type of three-dimensional space in which the device 10 can be displaced. The space can also be situated outdoors and outside any building. In either case, this method is useful for locating a person in a place where location by GPS or on the basis of telephonic relay is impossible.

Other ways of coding the constraints on the displacement of the device 10 are usable in the above method.

In some practices, rather than recording the position of the walls, it is possible to record all the possible paths. If the displacement of a particle does not follow one of these possible paths, then its weight is decreased.

Yet other practices feature recording the position of the doors rather than the walls. In such cases, the weight of a particle is increased if it the latter goes from one room to another by passing through a door.

Still other practices use different predefined constraints to update the value of the weight $w^i$.

In some cases, there exists other information that provides an approximate measurement of the device's position. Such cases would then include increasing the weight $w^i$ if the position $P^i_k$ is close to this approximate position and decreasing the weight if the position $P^i_k$ is far from this approximate position. Sources of such other information include power received by the device 10 from a radio source of known output power having a known position in the XYZ frame. A common example of such a radio source is a Wi-Fi terminal.

Although a constraint against collision of a particle with an impassable obstacle is, in practice, most common, it is not absolutely necessary if there exist other predefined constraints such as those described above that can be used.

Some embodiments omit the sixth step 100 of normalizing the weight $w^i$ of the particles $S^i$.

During the re-sampling of the particles, numerous other algorithms for determining the initial position of the regenerated particles can be used instead of that described above. A suitable algorithm is the Kullbak-Leibler-Divergence algorithm.

Other algorithms are possible for associating a new current value $\alpha^i_k$ and $\varepsilon^i_k$ with each regenerated particle. Each new value $\alpha^i_k$ is dependent on one or more of the values $\alpha^i_k$ associated with the particles that have not been eliminated and is independent of the values $\alpha^i_k$ associated with the particles that have been eliminated. The same holds for the new value $\varepsilon^i_k$.

Another simplified practice omits the seventh step 102. Even without re-sampling, the method described herein makes it possible to increase the precision with which one can located the device's position. This is because the weight $w^i$ of each particle $S^i$ associated with an incorrect current value $\alpha^i_k$ or $\varepsilon^i_k$ decreases as the loop iterates.

Other schemes for determining whether a particle is situated inside a zone are possible.

Practices further include those in which the zones have shapes other than polygons. Examples of such practices include those in which the zone is circular. In such cases, the map 16 records the circle's center and radius. In fact, there are no limitations on the zone's shape other than the requirement that the coordinates of its periphery be determinable in the in the XYZ frame.

In the foregoing method, each zone is associated at one and the same time with impassable-obstacle identifiers, a displacement law, and a favored direction.

In an alternative practice, several immediately contiguous zones share the same displacement law.

For example, in the illustrated embodiment the zones 30 . . . 34 are all associated with the first displacement law. In this case, it may be more beneficial to record, in the map 16, several stacked strata of zones for the same story.

Each stratum in the resulting set of stacked strata comprises at least one zone and, typically, a set of several zones covering the entire area of the floor. The zones of one stratum are distinguished from the zones of another stratum by the type of property that it associates with those zones.

In one example, a first stratum comprises zones that are associated with impassable-obstacle identifiers. A second stratum comprises zones that are associated only with a respective displacement law. Finally, a third stratum comprises zones that are associated solely with a favored direction.

When such a stack of strata is applied to the story 8, the zones of the first stratum are, for example, identical to the zones 30 to 35 except that they comprise only the identifiers of impassable obstacles.

In the illustrated embodiment, the second stratum is limited to two zones. One of them is identical to the zone 35 except that it is solely associated with the second displacement law. The second stratum's remaining zone corresponds to the union of zones 30 to 34 and is solely associated with the first displacement law.

The third stratum comprises four zones, the first and second being identical, respectively, to zones 32 and 35 except that they are solely associated with a respective favored direction. The third zone corresponds to the union of zones 30 and 31 and the fourth zone then corresponds to the union of zones 33 and 34, which are not associated with any favored direction.

A location method that relies on a map comprising several strata is identical to that described above except that, for each particle $S^i$, the zone of each stratum inside which it is situated is identified. Thereafter, it is these zones inside which it is situated that make it possible to identify the displacement law to be used and the predefined constraints to be tested so as to update the value of its weight $w^i$. The use of several strata of zones may simplify the definition of these zones.

In other practices, one of these strata corresponds to an accessibility map. Among these are practices in which the accessibility map has contiguous boxes. Among these are practices in which the contiguous boxes that are associated with the same value of the degree $\Lambda$ of accessibility are grouped together within one and the same zone.

Each zone can also be associated with additional predefined constraints for updating the weight $w^i$ of the particles situated in that zone. For example, some practices include associating, with each zone, a coefficient $w_\alpha$ of accessibility that represents the probability that a pedestrian will enter this zone. Thereafter, when updating the weight $w^i$ of a particle $S^i$ situated in this zone, the weight $w^i$ is set to be equal to its previous value multiplied by this coefficient $w_\alpha$.

Other displacement laws are usable.

In some practices, the standard deviations $\sigma_\alpha$ and $\sigma_\varepsilon$ are not constant. Among these are practices in which they are constant over long durations and then modified for a brief time interval before returning to their previous values. For example, solely during this brief time interval, the ratios $\Sigma\sigma_{\varepsilon k}/T$ and/or $\Sigma\sigma_{\alpha k}/T$ are permitted to exceed the previously defined thresholds.

Typically, the temporary increase of the values of the standard deviations $\sigma_\alpha$ and $\sigma_\varepsilon$ is used to reinitialize the current values $\alpha^i_k$ and $\varepsilon^i_k$. Generally, the values of the standard deviations $\sigma_\alpha$ and $\sigma_\varepsilon$ are constant for more than 90% of the time that the device 10 is being used. This prevents a rapid variation of the values of the corrective factors $\varepsilon^i$ and $\alpha^i$ during that 90% of the time.

Some practices include verifying that the ratio $\Sigma\sigma_{\varepsilon k}/T$ is maintained below a predetermined threshold over at least 90% of the time that the device 10 is being used. Among these practices are those that include setting the difference p-q equal to a constant. Thereafter, the ratio $\Sigma\sigma_{\varepsilon k}/T$ is computed for each value of p corresponding to an iteration of the updating step 96 occurring during this time of use. If at least 90% of the ratios thus computed are below the predetermined threshold, then one can infer that the ratio is being maintained below this predetermined threshold for more than 90% of the time that the device 10 is being used. The same computation can be used for the ratio $\Sigma\sigma_{\alpha k}/T$. The time of use is, for example, a period of continuous use of the device 10 without stopping the execution of the method of FIG. 4.

In other practices, the expectation of one of the probability distributions $Lp_\varepsilon$ or $Lp_\alpha$ is non-zero. This introduces an additional bias that is added to the real bias. The current values $\varepsilon^i_k$ or $\alpha^i_k$ can also be computed on the basis of a previous value other than $\varepsilon^i_{k-1}$ or $\alpha^i_{k-1}$. For example, $\varepsilon^i_k$ is computed on the basis of the previous value $\varepsilon^i_{k-n}$, where n is an integer greater than one. Thus, it is also possible to use the following relations to compute the current value of $\varepsilon^i_k$: $\varepsilon^i_k = (\varepsilon^i_{k-1} + \varepsilon^i_{k-2})/2 + \mu^i_\varepsilon$ or $\varepsilon^i_k = \varepsilon^i_{k-2} + \mu^i_\varepsilon$. The same thing applies to the computation of the current value $\alpha^i_k$.

Moreover, if it is known that the direction bias is zero or negligible, then the first and the second displacement laws are simplified by eliminating the corrective factor $\alpha^i$. Conversely, if it is known that the footstep bias is zero or negligible, then the first displacement law is simplified by eliminating the corrective factor $\varepsilon^i$. The corrective factor remaining in the first displacement law is thereafter estimated as described above with reference to FIG. 4. Conversely, it is possible to add additional corrective factors to the first displacement law. For example, if the best possible value of the coefficient A in the footstep model of the first displacement law is not known precisely, it is then possible to use the following footstep model $l_k=\pi A f_k+BT+C$, where $\pi$ is an additional corrective factor. The value of the factor $\pi$ is then estimated in the same manner as was described for the corrective factors $\alpha^i$ and $\epsilon^i$. It will be noted that in the case of the corrective factor $\pi$, the latter is a multiplicative factor and not a subtractive factor, that is to say that it multiplies the measured variable $f_k$.

Displacement laws other than those described above may be used. For example, a displacement law specifically adapted to the displacement on an escalator or on a moving walkway or in an elevator can readily be designed and associated with the zone comprising this escalator, this moving walkway or this elevator. Moreover, if there exists a measurement bias in these particular zones, then it is desirable to introduce a corrective factor into the displacement law to compensate this measurement bias. If, initially, the value of this corrective factor is not known, then this value is estimated in the same manner as was described for the corrective factors $\alpha^i$ and $\epsilon^i$.

Neither the ninth step 106 nor the tenth 108 need be carried out after each iteration of the loop. In some practices, these steps are carried out only after completion of every other iteration.

The previous embodiments have been described in the particular case where all processing steps to determine the position PA are carried out by the computer 14 of the device 10.

Alternative practices distribute these processing steps among several distinct computers. In some practices, these distinct computers include a computer server that is mechanically independent of the device 10. Among these practices are those in which the device 10 transmits the measurements to such a server, which then determines the position PA and returns it to the device 10, which then displays it on its screen 24. Among these practices are those that also include recording the map 16 in the server's memory.

Yet other practices include selecting a specific displacement law as a function of the zone in which the particle is situated in a manner that is independent of the other characteristics of the method of FIG. 4. Among these are practices that include selecting the displacement law independently of the use of corrective factors such as the factors $\alpha^i$ and $\epsilon^i$ and/or independently of the use, in the guise of predefined constraints, of the favored displacement directions.

Likewise, the use of favored directions of displacement associated with zones can also be implemented independently of the other characteristics of the method of FIG. 4. In particular, the use, in the guise of predefined constraints, of the favored directions of displacement can be implemented independently of the use of corrective factors such as the factors $\alpha^i$ and $\epsilon^i$ and/or independently of the selection of the displacement law as a function of the zone inside which the particle is situated.

Having described the invention and a preferred embodiment thereof, what is claimed as new and secured by Letters Patent is:

1. A method comprising making an improvement in the technical field of locating a device,
   wherein said improvement is the ability to locate said device in the absence of a GPS signal,
   wherein said method comprises locating said device, said device having been displaced inside a three-dimensional space,
   wherein an inertial platform is mounted on said device such that said inertial platform is on-board said device,
   wherein said inertial platform is configured for providing a measurement of a physical quantity representative of displacement of said device,
   wherein said inertial platform comprises a sensor system,
   wherein said sensor system comprises sensors,
   wherein said sensors comprise an accelerometer,
   wherein an information transmission bus connects said inertial platform to a computer that detects, on the basis of measurements provided by the accelerometer through the information transmission bus, movement of said inertial platform, said movement being indicative of said displacement of said device,
   wherein said computer further comprises a memory that contains, stored therein, a map and instructions for execution by said computer,
   wherein said method comprises executing a first step, executing a second step, and repeatedly executing a sequence of steps that comprises a third step, a fourth step, and a fifth step,
   wherein the first step comprises providing a map of the three-dimensional space and of predefined constraints on the displacements of the device in the three-dimensional space,
   wherein the second step comprises using said computer to generate several distinct particles,
   wherein each particle is associated with coordinates and with a weight, said coordinates coding the particle's position on the map, and the weight representing the probability that the device is situated at the site of the particle,
   wherein the third step comprises receiving measurements representative of the direction of displacement of the device and of the amplitude of the displacement of the device from a previous position thereof, the measurements being carried out by said sensors,
   wherein the fourth step comprises, for each particle, updating the coordinates of the position of the particle as a function of the measurements received during the third step and of a predetermined displacement law for displacing the particle from a previous position thereof to a new position thereof in a manner correlated with the measured displacement of the device,
   wherein the fifth step comprises, for each particle, when the latest displacement of the particle from the previous position to the new position satisfies the predefined constraints, increasing the weight associated with the particle relative to weights of the particles whose most recent displacement does not satisfy the predefined constraints, estimating the position of the device on the basis of the positions of the particles and of the weights associated with these particles by allotting, during the estimation, more importance to the positions of the particles associated with the highest weights,
   wherein the map contains several distinct zones, each distinct zone being associated with coordinates defining the position on the map of a periphery of the zone and with a predetermined displacement law, wherein at least two of the several distinct zones are associated with different predetermined displacement laws,
   wherein the predetermined displacement law is selected from among a set of several different displacement laws because the predetermined displacement law makes it possible to estimate, more precisely, on the basis of the same measurements received, the direction and the amplitude of the displacement of the device when the device is situated inside the zone than would be possible if any one of the other displacement law of the set of several different displacement laws were used, wherein the displacement laws from the set of several different displacement laws are distinguished from one another by mathematical operations that link the coordinates of a particle to the measurements received during the third step, and wherein the fourth step comprises, for each particle, identifying the zone inside which the particle is situated by comparing the coordinates of the particle with the peripheries of the zones of the map as defined by the coordinates provided during the first step, and the coordinates of the particle updating using just the predetermined displacement law associated with the zone identified during the identification operation.

2. The method of claim 1, wherein the predetermined displacement law comprises at least one first measured variable whose value is dependent on the measurement of the direction of displacement received during the third step, a second measured variable whose value is dependent on the measurement of the amplitude of the displacement received during the third step, and a corrective factor to correct for a bias, the corrective factor to be combined by an arithmetical operation with one of the measured variables, and wherein each particle is associated with a current value of the corrective factor, the current value of the corrective factor being constructed at each iteration of the fourth step on the basis of a previous value of the corrective factor, the previous value having been computed during a previous iteration of the fourth step, the current value being constructed by adding, to the previous value, a random variable, said random variable having been drawn according to a predefined probability law, current values of various particles having been initialized, before the first execution of the fourth step, to various initial values, and wherein, during the fourth step, for each particle whose coordinates are updated with the aid of the displacement law, the value of the corrective factor in the displacement law is set equal to the current value of the corrective factor that is associated with the particle.

3. The method of claim 2, the corrective factor is one of added and multiplied by the second measured variable and wherein the variation of the standard deviation $\sigma_\varepsilon$ of the predefined probability law is maintained below 10% per second for more than 90% of the time during which the method for locating the device is being used, wherein the variation of the standard deviation $\sigma_\varepsilon$ is given by $\Sigma\sigma_{\varepsilon k}/T$, wherein $\sigma_{\varepsilon k}$ is the standard deviation of the predefined probability law during the k-th iteration of the fourth step, wherein $\Sigma\sigma_{\varepsilon k}$ is the sum of the standard deviations $\sigma_{\varepsilon k}$ between the $q^{th}$ iteration and the $p^{th}$ iteration of the fourth step, wherein q is an integer that is less than p, and wherein T is the duration in seconds of the time interval which has elapsed between the $q^{th}$ and the $p^{th}$ iteration of the fourth step.

4. The method of claim 2, wherein the corrective factor is one of added to and multiplied by the first measured variable and wherein the variation of the standard deviation $\sigma_\alpha$ of the predefined probability law is maintained below 10 per second for more than 90% of the time during which the method for locating the device is being used, the variation of the standard deviation $\sigma_\alpha$ being given by the ratio: $\Sigma\sigma_{\alpha k}/T$, wherein $\sigma_{\alpha k}$ is the standard deviation of the predefined probability law during the $k^{th}$ iteration of the fourth step, wherein $\Sigma\sigma_{\alpha k}$ is the sum of the standard deviations $\sigma_{\alpha k}$ between the $q^{th}$ iteration and the $p^{th}$ iteration of the fourth step, where q is an integer that is less than p, and wherein T is the duration, in seconds, of the time interval that has elapsed between the $q^{th}$ and the $p^{th}$ iteration of the fourth step.

5. The method of claim 2, further comprising, after having repeatedly executed the sequence of steps, re-sampling the particles, wherein re-sampling the particles comprises eliminating the particles that are associated with the lowest weights, automatically generating new particles to replace the eliminated particles, and assigning a new current value of the corrective factor to each new particle thus generated, wherein each new value depends on one or more of the current values of corrective factors that are associated with particles that have not been eliminated and wherein each new value is independent of the current values of corrective factors that are associated with particles that have been eliminated.

6. The method of claim 1, wherein the predefined constraints contain coordinates coding the positions and the dimensions of obstacles that are impassable to the device in the three-dimensional space, and wherein the fifth step comprises, for each particle: searching for an intersection between a segment that extends between the previous position and the new position and an impassable obstacle by using the coordinates of the impassable obstacle that were provided during the first step, and decreasing the weight associated with the particle when such an intersection exists and, in the converse case, executing one of the action chosen in the group composed of the absence of decreasing the weight associated with the particle and increasing the weight associated with the particle.

7. The method of claim 6, wherein the map that was provided during the first step contains several distinct zones, each distinct zone being associated: with coordinates defining the position on the map of its periphery and with a list of identifiers of just the impassable obstacles situated inside the zone, wherein the fifth step systematically comprises, for each particle: a first operation followed by a second operation, wherein the first operation comprises identifying the zone inside which the particle is situated by comparing the updated coordinates of the particle with the peripheries of the zones of the map, and wherein the second operation comprises searching for an intersection between a segment that extends between the previous position and the new position and solely the impassable obstacles whose identifiers are contained in the list associated with the zone identified during the first operation.

8. The method of claim 1, wherein the map provided during the first step contains at least one zone with a favored direction of displacement, the zone being associated: with coordinates defining the position, on the map, of the zone's periphery, and with a favored direction of displacement within the zone, wherein the fifth step comprises, for each particle: detecting the presence of the particle inside the zone with the favored direction of displacement by comparing the coordinates of the particle with the periphery of the zone with the favored direction of displacement defined by the coordinates provided during the first step, when the particle is detected as being present inside the zone with the favored direction of displacement, increasing the weight of the particle when the angular deviation between the direction of displacement of the particle from the previous position to the new position and the favored direction of displacement associated with the zone is equal to 0° or to 1800 to within plus or minus $\sigma_Y$, wherein increasing the weight comprises increasing the weight relative to the weights of the other particles situated inside the same zone and for which the deviation is not equal to 0° or to 180 to within plus or minus $\sigma_Y$, wherein $\sigma_Y$ is a predetermined angular tolerance, and when the particle is detected as being outside of the zone with favored direction of displacement, prohibiting the use of the favored direction of displacement associated with the zone to update the weight of the particle.

9. A manufacture comprising a non-transitory information recording medium that comprises instructions for executing the method of claim 1 when the instructions are executed by said computer.

10. An apparatus comprising an electronic unit for locating a device displaceable inside a three-dimensional space, the electronic unit comprising:
a memory containing a map of the three-dimensional space and predefined constraints on the displacements of the device in the three-dimensional space and a computer programmed for: executing a first step, repeating a sequence of steps comprising a second step, a third step, and a fourth step, and executing a fifth step, wherein the first step comprises generating several distinct particles, each particle being associated: with coordinates coding its position on the map and with a weight representing the probability that the device is situated at the site of the particle,
wherein the second step comprises receiving measurements representative of the direction of displacement of the device and of the amplitude of the displacement from a previous position of the device, the measurements being carried out by sensors onboard the displaced device,
wherein the third step comprises updating the coordinates of the position of each particle as a function of the measurements received and of a predetermined displacement law for displacing the particle from a previous position thereof to a new position thereof in a manner correlated with the measured displacement of the device,
wherein the fourth step comprises, for each particle, when the latest displacement of the particle from the previous position to the new position satisfies the predefined constraints, increasing the weight associated with the particle with respect to the weights of the particles whose latest displacement fail to satisfy the predefined constraints, and
wherein the fifth step comprises estimating the position of the device on the basis of the positions of the particles and of the weights associated with the particles by allotting, during the estimation, more importance to the positions of the particles associated with the highest weights, wherein: the map recorded in the memory contains several distinct zones, each distinct zone being associated: with coordinates defining the position, on the map, of a periphery thereof, and a predetermined displacement law from among a set of several different displacement laws, wherein at least two of the several distinct zones are associated with different predetermined displacement laws, the predetermined displacement law associated with a zone having been selected because the predetermined displacement law makes it possible to estimate more precisely, on the basis of the same measurements received, the direction and the amplitude of the displacement of the device when the device is situated inside the zone than any one of the other displacement laws of the set of several different displacement laws wherein the different displacement laws are distinguished from one another by mathematical operations that link the coordinates of a particle to the measurements received during the second step, and wherein the computer is further programmed so as to, during the third step and systematically for each particle: identify the zone inside which the particle is situated by comparing the coordinates of the particle with the peripheries of the zones of the map, and then use, for the updating of the coordinates of the particle, just the displacement law associated with the identified zone.

11. The apparatus of claim 10, wherein the device is directly transportable by a pedestrian who is moving within the three-dimensional space, the device comprising an inertial platform configured to measure physical quantities representative of the direction of displacement of the device and of the amplitude of the displacement, wherein the device comprises the electronic unit.

12. A non-abstract method that comprises making an improvement in the way that computers operate and making an improvement in a technical field, wherein the technical field is that of locating a device that is displaced inside a three-dimensional space, wherein said non-abstract method comprises locating the device, wherein locating the device comprises executing a first step, executing a second step, repeatedly executing a third step, a fourth step, and a fifth step, and executing a sixth step, wherein said first step comprises providing a map of the three-dimensional space and of predefined constraints on the displacements of the device in the three-dimensional space, wherein the second step comprises causing an electronic computer to generate several distinct particles, wherein each particle is associated with coordinates that code the position of the particle on the map and with a weight that represents the probability that the device is situated at the site of the particle, wherein the third step comprises receiving measurements representative of the direction of displacement of the device and of the amplitude of the displacement from a previous position of the device, the measurements being carried out by sensors onboard the displaced device, wherein the fourth step comprises updating the coordinates of the position of each particle as a function of the measurements received during the third step and of a predetermined displacement law for displacing the particle from its previous position $P^i_{k-1}$ to a new position $P^i_k$ in a manner correlated with the measured displacement of the device, wherein the fifth step comprises for each particle, when the latest displacement of the particle from the position $P^i_{k-1}$ to the position $P^i_k$ satisfies the predefined constraints, increasing the weight associated with the particle with respect to the weights of the particles whose latest displacement fails to satisfy the predefined constraints, wherein the sixth step comprises estimating the position of the device on the basis of the positions of the particles and of the weights associated with the particles by allotting, during the estimation, more importance to the positions of the particles associated with the highest weights, wherein the map that was provided during step the first step contains at least one zone with a favored direction of displacement associated with coordinates defining the position, on the map, of the zone's periphery, and with a favored direction of displacement in the zone, wherein the fifth step further comprises, for each particle: detecting the presence of the particle inside the zone with the favored direction of displacement by comparing the coordinates of the particle with the periphery of the zone with the favored direction of displacement defined by the coordinates provided during the first step, and, when the particle is detected as being present inside the zone with the favored direction of displacement, increasing the weight of the particle when the angular deviation between the direction of displacement of the particle from the position $P^i_{k-1}$ to the position $P^i_k$ and the favored direction of displacement associated with the zone is equal to 0° or to 1800 to within plus or minus $\sigma_\gamma$, wherein increasing the weight is carried out with respect to the weights of the other particles situated inside the same zone and for which the deviation is not equal to 0° or to 180 to within plus or minus $\sigma_\gamma$, where $\sigma_\gamma$ is a predetermined angular tolerance, and when the particle is detected as being outside of the zone with the favored direction of displacement, prohibiting the use of the favored direction of displacement associated with the zone to update the weight of the particle.

13. The method of claim 12, wherein the displacement law comprises: at least one first measured variable whose value is dependent on the measurement of the direction of displacement received during the third step, a second measured variable whose value is dependent on the measurement of the amplitude of the displacement received during the third step, and a corrective factor of a bias combined by an arithmetical operation with one of the measured variables, wherein each particle is also associated with a current value of the corrective factor, the current value of the corrective factor being constructed at each iteration of the fourth step on the basis of a previous current value of the corrective factor, which was computed during a previous iteration of the fourth step, to which is added a random variable drawn according to a predefined probability law, and the current values of various particles being initialized, before the first execution of the fourth step, to various initial values, and during the fourth step, for each particle whose coordinates are updated with the aid of the displacement law, the value of the corrective factor in the displacement law is taken equal to the corrective factor's current value associated with the particle.

14. The method of claim 13, wherein the corrective factor is, in the displacement law, added together or multiplied with the second measured variable and the variation of the standard deviation $\sigma_\varepsilon$ of the predefined probability law is maintained below 10% per second for more than 90% of the time of use of the method for locating the device, the variation of the standard deviation $\sigma_\varepsilon$ being given by $\Sigma\sigma_{\varepsilon k}/T$, where: $\sigma_{\varepsilon k}$ is the standard deviation of the predefined probability law during the $k^{th}$ iteration of the fourth step, $\Sigma\sigma_{\varepsilon k}$ is the sum of the standard deviations $\sigma_{\varepsilon k}$ between the $q^{th}$ iteration and the $p^{th}$ iteration of the fourth step, where q is an integer that is less than p, T is the duration in seconds of the time interval which has elapsed between the $q^{th}$ and the $p^{th}$ iteration of the fourth step.

15. The method of claim 13, wherein the corrective factor is, in the displacement law, added together or multiplied with the first measured variable and the variation of the standard deviation $\sigma_\alpha$ of the predefined probability law is maintained below 10° per second for more than 90% of the time of use of the method for locating the device, the variation of the standard deviation $\sigma_\alpha$ being given by $\Sigma\sigma_{\alpha k}/T$, wherein $\sigma_{\alpha k}$ is the standard deviation of the predefined probability law during the $k^{th}$ iteration of the fourth step, wherein $\Sigma\sigma_{\alpha k}$ is the sum of the standard deviations $\sigma_{\alpha k}$ between the $q^{th}$ iteration and the $p^{th}$ iteration of the fourth step, where q is an integer that is less than p, and wherein T is the duration in seconds of the time interval which has elapsed between the $q^{th}$ and the $p^{th}$ iteration of the fourth step.

16. The method of claim 13, wherein, after several iterations of the third through fifth steps, the method comprises a step of re-sampling the particles during which the particles associated with the lowest weights are eliminated, and new particles are automatically generated to replace the eliminated particles, a new current value of the corrective factor being assigned to each new particle, each new value being dependent on one or more of the corrective factor's current values associated with the particles that have not been eliminated and independent of the corrective factor's current values associated with the particles that have been eliminated.

17. The method of claim 12, wherein, during the first step, the predefined constraints that are provided contain coordinates that code the positions and the dimensions of obstacles that are impassable to the device in the three-dimensional space, and wherein the fifth step comprises, for each particle, searching for an intersection between the segment $[P^i_{k-1}; P^i_k]$ and an impassable obstacle by using the coordinates of the impassable obstacle that were provided during the first step, decreasing the weight associated with the particle when such an intersection exists and, in the converse case, executing an action selected from the group consisting of refraining from decreasing the weight associated with the particle and increasing the weight associated with the particle.

18. The method of claim 17, wherein during the first step, the map provided contains several distinct zones, each distinct zone being associated with coordinates defining the position, on the map, of its periphery, and with a list of identifiers of just the impassable obstacles situated inside the zone, wherein the fifth step comprises, for each particle, identifying the zone inside which the particle is situated by comparing the updated coordinates of the particle with the peripheries of the zones of the map that are defined by the coordinates provided during the first step, and searching for an intersection between the segment $[P^i_{k-1}; P^i_k]$ and solely the impassable obstacles whose identifiers are contained in the list associated with the zone identified during the identification operation.

19. The method of claim 12, wherein the map that was provided during the first step contains several distinct zones, each distinct zone being associated with coordinates defining the position, on the map, of a periphery of that zone, and with a displacement law from among a set of several different displacement laws, the displacement law associated with a zone making it possible to estimate, more precisely, on the basis of the same measurements received, the direction and the amplitude of the displacement of the device when the latter is situated inside the zone than if any one of the other displacement laws of the set were used, wherein the different displacement laws are distinguished from one another by the mathematical operations that link the coordinates of a particle to the measurements received during the third step, and wherein the fourth step further comprises, for each particle: identifying the zone inside which the particle is situated by comparing the coordinates of the particle with the peripheries of the zones of the map, which are defined by the coordinates provided during the first step, and using, for the updating of the coordinates of the particle, just the displacement law associated with the zone identified during the identification operation.

20. A tangible and non-transitory information-recording medium, that comprises instructions for causing the electronic computer to execute the method recited in claim 12.

21. An apparatus comprising an electronic unit for locating a device that is displaceable inside a three-dimensional space, the electronic unit comprising a memory containing a map of the three-dimensional space and predefined constraints on the displacements of the device in the three-dimensional space and an electronic computer whose functionality has been improved by programming said electronic computer to carry out a function that could not have been carried out in the absence of said programming, wherein said electronic computer has been programmed for executing a first step, repeatedly executing second, third, and fourth steps, and executing a fifth step, wherein the first step comprises generating several distinct particles, each particle being associated with coordinates coding its position on the map, and with a weight representing the probability that the device is situated at the site of the particle, wherein the second step comprises receiving measurements representative of the direction of displacement of the device and of the amplitude of the displacement from its previous position, the measurements being carried out by sensors onboard the displaced device, wherein the third step comprises updating the coordinates of the position of each particle as a function of the measurements received and of a predetermined displacement law for displacing the particle from its previous position $P^i_{k-1}$ to a new position $P^i_k$ in a manner correlated with the measured displacement of the device, wherein the fourth step comprises, for each particle, when the latest displacement of the particle from the position $P^i_{k-1}$ to the position $P^i_k$ satisfies the predefined constraints, increasing the weight associated with the particle with respect to the weights of the particles whose latest displacement infringes these predefined constraints, and wherein the fifth step comprises estimating the position of the device on the basis of the positions of the particles and of the weights associated with the particles by allotting, during the estimation, more importance to the positions of the particles associated with the highest weights, wherein the map recorded in the memory contains at least one zone with a favored direction of displacement associated with coordinates defining the position on the map of its periphery, and with a favored direction of displacement in the zone, and wherein, as part of causing an improvement in computer technology caused by having programmed said computer to be able to carry out a novel function, the computer is programmed so as to, during the fourth step, and for each particle: detect the presence of the particle inside the zone with favored direction of displacement by comparing the coordinates of the particle with the periphery of the zone with favored direction of displacement defined by the coordinates provided as part of the map of the three-dimensional space and of the predefined constraints on the displacements of the device in the three-dimensional space, and then, when the particle is detected as being present inside the zone with favored direction of displacement, increase the weight of the particle when the angular deviation between the direction of displacement of the particle from the position $P^i_{k-1}$ to the position $P^i_k$ and the favored direction of displacement associated with the zone is equal to 0° or to 1800 to within plus or minus $\sigma_Y$, wherein increasing the weight is carried out with respect to the weights of the other particles situated inside the same zone and for which the deviation is not equal to 0° or to 180 to within plus or minus $\sigma_Y$, where $\sigma_Y$ is a predetermined angular tolerance, and when the particle is detected as being outside of the zone with favored direction of displacement, prohibiting the use of the favored direction of displacement associated with the zone to update the weight of the particle.

22. The apparatus of claim 21, further comprising said device, wherein said device is directly transportable by a pedestrian who is moving in a three-dimensional space, as a result of which the device experiences displacement in the three-dimensional space, wherein the device comprises an inertial platform that is able to measure physical quantities representative of the direction of displacement of the device and of the amplitude of the displacement, wherein the electronic-locating unit is a constituent of the device.

* * * * *